United States Patent [19]

Devanney

[11] 4,418,273

[45] Nov. 29, 1983

[54] MECHANICAL FUEL PUMP COMPUTER CONVERSION MECHANISM

[75] Inventor: Raymond H. Devanney, Winsted, Conn.

[73] Assignee: Veeder Industries Inc., Hartford, Conn.

[21] Appl. No.: 360,394

[22] Filed: Mar. 22, 1982

[51] Int. Cl.³ .......................... B67D 5/72; F16H 3/22; G06C 15/04

[52] U.S. Cl. ............................... 235/61 L; 235/61 M; 235/94 A; 74/348

[58] Field of Search ................ 235/61 L, 61 M, 94 A, 235/94 R; 74/340, 348, 681

[56] References Cited

U.S. PATENT DOCUMENTS 2,814,444 11/1957 Bliss ................................. 235/94 R 4,136,573 1/1979 Smilgys et al. ...................... 74/348

4,292,506 9/1981 Devanney ......................... 235/61 L

*Primary Examiner*—Benjamin R. Fuller

*Attorney, Agent, or Firm*—Prutzman, Kalb, Chilton & Alix

[57] ABSTRACT

A conversion mechanism for selective conversion of a conventional mechanical fuel pump computer to selectively extend the unit volume price range of the computer while maintaining the rotational speed of the right hand cost and volume counter wheels of the computer within acceptable limits and mathematical correspondence of the volume counter readout with the cost counter readout and the established unit volume price. The conversion mechanism comprises cost and volume drive ratio selector mechanisms and one or more sets of single transfer, double transfer and quadruple transfer right hand cost counter wheels and a decimal point selector mechanism for shifting the decimal point of the unit volume price setting and/or cost counter readout.

21 Claims, 10 Drawing Figures

MECHANICAL FUEL PUMP COMPUTER CONVERSION MECHANISM

TECHNICAL FIELD

The present invention relates generally to mechanical fuel pump computers of the type employed in fuel dispensing apparatus for computing and registering the volume and cost amounts of fuel delivered and to mechanical registers employed in such computers of the type shown and described in U.S. Pat. No. 2,814,444 of Harvey N. Bliss, dated Nov. 26, 1957 and entitled "Register" and relates more particularly to conversion of such mechanical computers to extend their practical utility for higher fuel prices in the U.S.A., U.K. and other countries.

BACKGROUND

The conventional mechanical fuel pump computer incorporates a mechanical register having a pair of counters on each of two opposite faces of the register (with each counter having a bank of four or five coaxial rotary number wheels) for registering on each of the opposite faces of the register, the cost and volume amounts of fuel dispensed. Such a register is disclosed in the aforementioned U.S. Pat. No. 2,814,444.

The conventional mechanical fuel pump computer also incorporates a mechanical variator for establishing and posting the unit volume price of fuel. Such a mechanical variator is disclosed in U.S. Pat. No. 4,136,573 of Bruno S. Smilgys et al, dated Jan. 30, 1979 and entitled "Extended Range Variator Conversion Mechanism". The variator disclosed in U.S. Pat. No. 4,136,573 provides for establishing and posting a unit volume price within a range of 0000 to 2999, and in a modified form of that variator disclosed in pending U.S. patent application Ser. No. 259,708 of Raymond H. Devanney, filed May 1, 1981, entitled "Extended Range Variator Conversion Mechanism", and assigned to the assignee of the present application, the variator is operable for establishing and posting a unit volume price within an extended range of 0000 to 5999.

In the conventional mechanical computer installation, the mechanical computer is mechanically driven by a suitable fuel meter for registering the volume amount of fuel delivered (conventionally in gallons in the U.S.A. and in liters in the U.K.) and the cost amount of fuel delivered in accordance with the volume amount delivered and the unit volume price established by the variator setting. In such an installation, the mechanical computer will normally have a long, maintenance free useful life if the rotational speeds of the computer parts are held within acceptable limits. The recommended maximum operating speed of the mechanical computer is usually given as a recommended maximum operating speed of the right hand or lowest order number wheels of the computer. Such a maximum operating speed is preferably about 150 revolutions per minute (rpm) but may be established as high as 200 or even 250 rpm. In any event, the mechanical computer is preferably operated at the lowest practical speed to extend its useful life.

The normal maximum fuel delivery rate of a conventional fuel dispenser is typically approximately 15 gallons per minute in the U.S.A. and 50 liters per minute in the U.K. Also, in the conventional fuel dispenser the right hand number wheels of both the cost and volume counters are single transfer, 10 value wheels marked 0–9 for recording a value of ten for each revolution. Thus, with a maximum right hand number wheel speed of 150 rpm and 10 value right hand number wheels, the maximum cost rate of delivery is $15.00 a minute in the U.S.A. (where the right hand cost counter wheel is used to register the cents amount of fuel dispensed) and the maximum gallon unit volume price is $1.00 (i.e. $15.00/minute÷15 gallons/minute). In the United Kingdom, where the right hand cost counter wheel is used to register the pence amount of fuel dispensed and the maximum fuel delivery rate is 50 liters per minute, the maximum unit volume price is 30 pence per liter with a maximum wheel speed of 150 rpm.

In the U.S.A. and U.K. and in other countries using other currencies and having an inflation rate which is often higher than that in the U.S.A. and U.K., the speed of the right hand cost counter wheels has been reduced by increasing their value. For example, conversion of the mechanical computer to replace the conventional 10 value right hand cost counter wheels with 20 value wheels enables the cost counter drive ratio to be reduced by a factor of two and provides a cost indicating rate of 3,000 per minute, thereby permitting for example a maximum unit volume price of 60 pence per liter in the U.K. and $2.00 a gallon in the U.S.A. without exceeding a right hand number wheel speed of 150 rpm.

Because of the escalating unit volume price of fuel and the resulting increasing rate of rotation of the right hand number wheels of the register cost counters for any given maximum volume rate of fuel dispensed, the conventional 10 value or single transfer right hand cost counter wheel has in some instances been replaced by a multiple transfer wheel (e.g. a 20 value or double transfer wheel or a 40 value or four transfer wheel) or by a 100 value, single transfer wheel to reduce the rate of rotation, required drive torque and rate of wear of the cost counters. When the value of the right hand cost counter wheels are changed, for example by substituting 20 value double transfer wheels for 10 value, single transfer wheels, modification of the drive train to the mechanical cost counters is required so that the rate of rotation of the right hand cost counter wheels is reduced by the same factor that it is increased in value. As a result, for any given unit volume price setting of the variator, the right hand cost counter wheels accumulate the cost amount of fuel dispensed at the same cost rate but at a lower rotational speed.

In order to overcome the money wheel speed problem in any particular country, the rotational speed of the right hand cost counter wheels can be reduced as described above where that is a practical solution within the constraints imposed by the pricing requirements and practices of that country. However, it may become necessary or desirable to change the right hand cost counter wheels and cost counter drive ratio to reduce the number wheel operating speed by one factor in one country and by a different factor in a different country.

In the usual mechanical computer installation, the right hand or lowest order volume counter wheels conventionally are unit volume wheels (i.e. rotate one revolution for each unit volume of gasoline dispensed) and are generally readable only to the nearest one-tenth unit volume of fuel dispensed. Accordingly, the calculated cost determined by multiplying the volume counter readout and the unit volume price established by the variator setting is conventionally accurate for example only to the nearest $0.005 at a unit volume price of $1.00 and to the nearest $0.025 at a unit volume price of $5.00. As a result, it is becoming more and more important to read the volume counters to the nearest one-hundredth unit volume to provide greater correspondence between the calculated cost and the cost displayed by the cost counters. Such can be accomplished by increasing the volume counter drive ratio by a factor of ten, in effect to shift the volume counter decimal point one place to the left. However, because of the resulting higher right hand wheel speed and lower maximum volume readout, the volume counter drive ratio is preferably changed only when such becomes necessary as a result of the escalating unit volume price.

From a manufacturing and repair standpoint, it is highly desirable to use the same mechanical computer configuration throughout the world and without structural modification of the computer. Such flexibility is difficult to achieve particularly because of the varying local requirements, standards and practices regarding the unit volume measure to be used and the least significant digit to which the unit volume price in the local currency is to be set, posted and registered by the mechanical computer. For example, in the U.S.A., the gallon is the standard unit volume on which gasoline is priced and gasoline continues to be priced to the nearest one-tenth cent even to where fuel is now priced to four places to the nearest one-tenth cent. Also, in most countries, the oil companies continue to prefer to price fuel to the smallest possible increment primarily for purposes of price competition.

There is no real problem in replacing the right hand cost counter wheels (e.g. to substitute a 20 value, double transfer wheel for a 10 value, single transfer wheel) since such wheel replacement can be done without removing the computer from the pump and therefore at a relatively low cost. However, in the conventional mechanical computer, it is expensive to change the volume counter drive ratio or to change the cost counter drive ratio when the cost counter wheels are replaced as such typically requires removing the computer from the pump and separating the register from the variator to modify the counter drive train gearing.

DISCLOSURE OF INVENTION

Accordingly, it is a principal object of the present invention to provide in a mechanical fuel pump computer a new and improved drive ratio conversion mechanism which is both accessible and convenient to operate to convert the computer to a different cost counter drive ratio and/or different volume counter drive ratio. In accordance with the preferred embodiment of the present invention, at least three cost counter drive ratios and two volume counter drive ratios are provided which may be readily individually selected without dismantling the computer and adding gears or other parts.

It is another object of the present invention to provide easily accessible conversion gearing in the register of the mechanical computer to enable to cost counter drive ratio to be reduced as the unit volume price of fuel increases and thereby to make the computer virtually inflation-proof without requiring the computer to be periodically removed from the pump for modification.

In accordance with a further object of the present invention, a fuel pump register conversion mechanism is provided for adapting the mechanical computer to varying world currencies and varying world pricing practices and requirements, including those in the U.S.A., U.K. and many other countries of the world.

It is another object of the present invention to provide drive ratio conversion gearing in the register of a mechanical fuel pump computer for maintaining for the foreseeable future the practical utility of the mechanical computer in the U.S.A., U.K. and other countries as the cost of fuel escalates.

It is a further object of the present invention to provide new and improved conversion gearing in the cost counter drive train which permits use of a substantially higher value right hand cost counter wheel (e.g. a 100 value right hand wheel instead of a conventional 10 value right hand wheel) by preventing or minimizing undesirable inertia caused overtravel of the wheel and the resulting inaccurate cost counter reading which otherwise occurs upon sudden termination of a fuel delivery. The cost counter reading error caused by any such wheel overtravel is increased by the same factor as the wheel value is increased, and in accordance with the present invention, the new and improved conversion gearing essentially restricts such overtravel to that permitted by any small amount of backlash or play in any cost counter drive train gearing downstream of the conversion gearing.

Other objects will be in part obvious and in part pointed out more in detail hereinafter.

A better understanding of the invention will be obtained from the following detailed description and the accompanying drawings of an illustrative application of the invention.

DESCRIPTION OF THE PREFERRED EMBODIMENT

Figure 1:
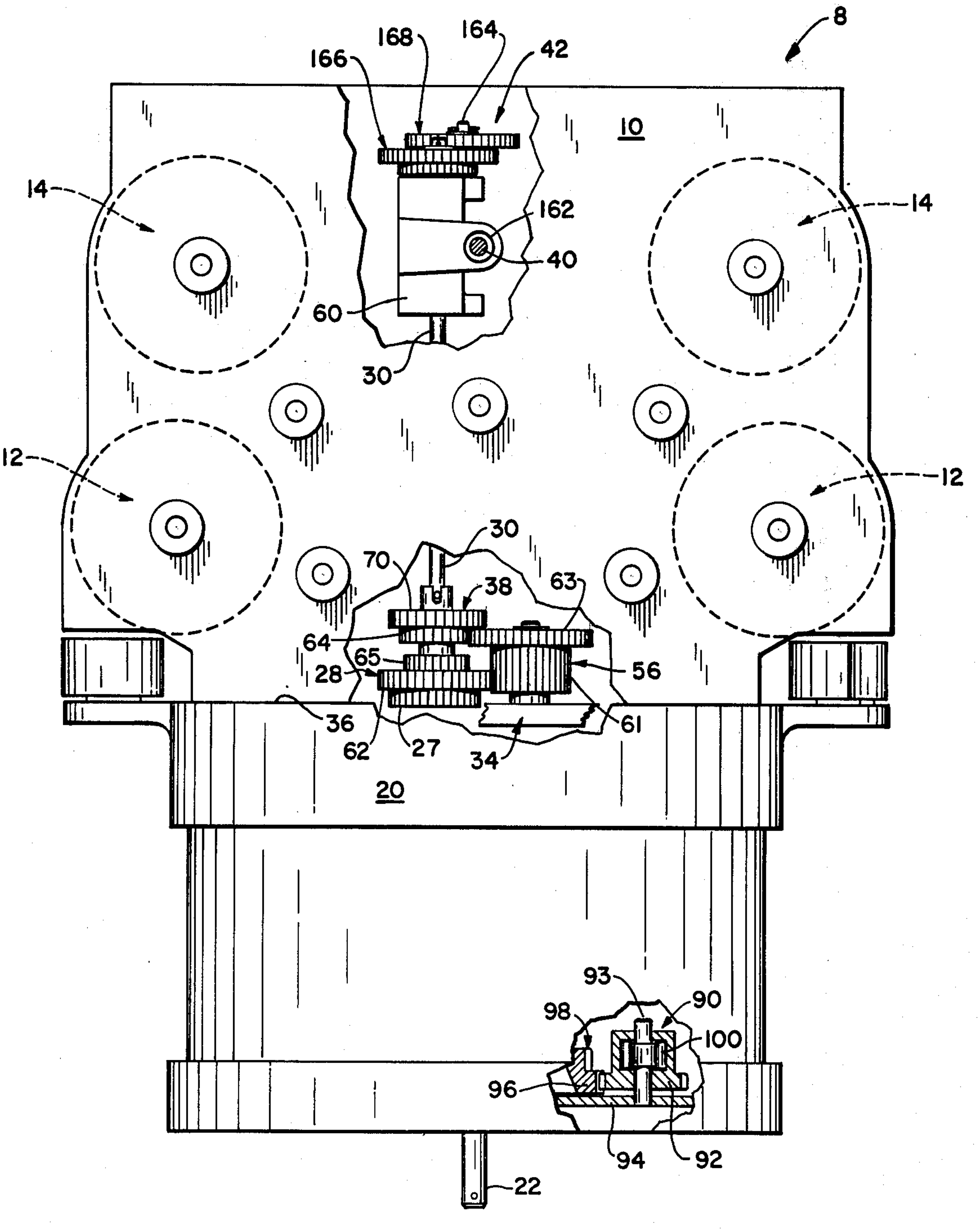
FIG. 1 is a side elevation view, partly broken away and partly in section, of a mechanical fuel pump computer incorporating an embodiment of a computer conversion mechanism of the present invention.

Referring now to the drawings in detail wherein like reference numerals indicate like parts throughout the several figures, there is shown a mechanical fuel pump computer 8 having a mechanical register 10 and a mechanical variator or change speed mechanism 20. The register 10 has a pair of volume and cost counters 12, 14 on each of two opposite faces of the register (with each counter having a bank of four coaxial rotary number wheels) for registering on each of the opposite faces of the register, the cost and volume amounts of fuel dispensed. The register 10 may be identical to the register disclosed in the aforementioned U.S. Pat. No. 2,814,444 except as described hereinafter.

The variator or change speed mechanism 20 provides for establishing and posting a unit volume price of gasoline within a four place unit volume price range. The variator 20 may be identical to the variator shown and described in the aforementioned U.S. Pat. No. 4,136,573 or be modified as shown and described in the aforementioned U.S. patent application Ser. No. 259,708 and therefore will not be described in detail herein. Briefly, however, the variator 20 comprises a center drive shaft 22 which is suitably connected to be rotated by a conventional fuel meter (not shown) of a gasoline dispenser (not shown) in accordance with the volume amount of gasoline dispensed. In the conventional mechanical fuel pump computer installation, the variator center shaft 22 is rotated four revolutions for each gallon of fuel dispensed where the unit volume price of fuel is based on a gallon unit volume. Where the unit volume price is based on a liter unit volume, the variator center shaft is conventionally rotated two revolutions for each liter of fuel dispensed.

The variator 20 has a price selector mechanism (not shown) adapted to be selectively set for establishing any four place unit volume price within a range of 0000 to 2999 inclusively as shown in the aforementioned U.S. Pat. No. 4,136,573 or within a range of 0000 to 5999 inclusively as shown in the aforementioned U.S. patent application Ser. No. 259,708.

A cost output gear 26 of the variator 20 is rotatably mounted on the variator center drive shaft 22 and is driven in accordance with the volume amount of fuel delivered and the unit volume price established by the variator setting. The cost output gear 26 intermeshes with a gear 27 of a cost input compound gear 28 of the register 10 which is rotatably mounted on the lower end of a vertical cost shaft 30 of the register 10. A two-position decimal point shift lever 34 is pivotally mounted on the variator top plate 36 to selectively connect the cost input compound gear 28 to a second compound gear 38 which is secured to the vertical cost shaft 30. The vertical cost shaft 30 drives a horizontal or cross cost shaft 40 by means of a cost drive ratio selector mechanism 42 hereinafter described. The horizontal cost shaft 40 is connected in a conventional manner to rotate the pair of opposed cost counters 14 of the register 10 for registering the cost amount of gasoline dispensed in accordance with the volume amount of gasoline dispensed and the four place unit volume price established by the variator setting.

A volume output gear 44 of the variator is secured to the upper end of the variator center shaft 22 and engages a volume input gear 46 of the register 10 rotatably mounted on a horizontal or cross volume shaft 48 of the register 10. By means of a two-position volume drive ratio selector mechanism 50 hereinafter described, the input volume gear 46 of the register 10 is connected for rotating the pair of opposed volume counters 12 of the register 10 for registering the volume amount of gasoline dispensed.

The two-position decimal point shift lever 34 has a first pivotal operating position at which a first "low" speed or "low" drive ratio compound gear 54 engages the vertical cost shaft gears 28,38 to drive the vertical cost shaft at a first "low" drive ratio. The shift lever 34 is mounted to be pivoted from its first operating position to a second operating position at which a second "high" speed or "high" drive ratio compound gear 56 engages the vertical cost shaft at a second "high" drive ratio which is ten times the "low" drive ratio. Specifically, the "low" and "high" gear ratios are 3:10 and 3:1 respectively.

More particularly, the "high" speed compound gear 56 has (a) a lower gear 61 engageable with an intermediate gear 62 of the lower compound gear 28 and (b) an upper gear 63 engageable with a lower gear 64 of the upper compound gear 38 to provide a 3:1 drive or gear ratio. The "low" speed compound gear 54 has (a) a lower gear 66 engageable with an upper gear 65 of the compound gear 28 and (b) an upper gear 68 engageable with an upper gear 70 of the compound gear 38 to provide a 3:10 drive or gear ratio.

The selector lever 34 has an arm 172 with an outer end 173 extending beyond the register side plate to provide for manually setting the lever 34 in each of its operating positions. A pair of angularly spaced openings 174 are provided in the outer end 173 of the lever 34 for receiving a set screw 175, and two threaded apertures 176 are provided in the variator top plate 36 for selectively locating the lever in its "low" and "high" speed drive positions.

The selector lever 34 is mounted directly on top of the variator 20. For that purpose, the selector lever 34 has a partially cylindrical opening 180 for receiving a partially cylindrical step 182 of an integral variator top plate projection 183. Accordingly, the selector lever 34 is adapted to be placed upon the cylindrical step 182 of the variator top plate 36 and pivotally positioned to be held in each of its two operating positions by the set screw 175. Thus, the variator 20 is simply modified to accommodate the selector lever 34 by the provision of the threaded apertures 176 in the variator top plate 36.

The "high" drive ratio is used, for example in the U.S.A. with 10 value, single transfer right hand cost counter wheels and a price range which provides for pricing fuel to the nearest 1/10 th cent in a conventional manner. The "low" drive ratio is then useful with 100 value right hand cost counter wheels (i.e. in effect to shift the decimal point of the cost counter wheels one place to the right) without changing the unit volume price range. Then the "high" drive ratio can be selected without changing the right hand cost counter wheels to shift the unit volume price decimal point one place to the right, for example in the U.S.A. for pricing fuel to the nearest one cent. The cost counter decimal point and price range decimal point can thereby be successively alternately shifted with the decimal point shift lever 34.

The variator unit volume price range can thereby be increased by a factor of ten, for example in the U.S.A. to increase the maximum available unit volume price setting from $2.999 or $5.999 to $29.99 or $59.99 respectively. Accordingly, the two-position decimal point shift lever 34 can be set for using 10 value, 100 value or even 1000 value single transfer right hand numeral wheels and provide a variator price range in accordance with the currency and unit volume measure with which the computer is used.

As previously indicated, in some countries the center shaft 22 is rotated two revolutions (i.e. one-half the conventional U.S.A. rate) for each unit volume of fuel dispensed on which the unit volume price is based. In that event, the variator center shaft 22 and variator gearing are rotated at one-half the normal rate to reduce the wear and required drive torque for driving the variator. Accordingly, the cost and volume output gears 26,44 of the variator and the cost and volume input gears 27,46 of the register are suitably modified to double their drive ratio to offset the variator input drive at one-half rate.

In accordance with the present invention, the cost drive ratio selector mechanism 42 provides for selecting the gear or drive ratio to the cost counters 14. In the shown example, the cost drive ratio selector mechanism 42 provides for individually selecting each of three available gear ratios which are 2:1; 1:1 and 1:2. The three available gear ratios therefore provide three *relative* gear or drive ratios of 1, ½ and ¼ respectively.

The 2:1 gear ratio is the basic gear ratio for use with 10 value and 100 value (and even 1000 value), single transfer right hand cost counter wheels 190, 191 respectively. The 1:1 gear ratio provides for driving the right hand cost counter wheels at one half the speed of the basic gear ratio and is used with 20 value and 200 value (and even 2000 value), double transfer right hand money wheels 195, 196 respectively. The 1:2 gear ratio provides for driving the right hand cost counter wheels at one-fourth the speed of the basic gear ratio and is used with 40 value and 400 value (and even 4000 value), four transfer right hand money wheels 198, 199 respectively. For example, in the U.S.A. the 10, 20 and 40 value right hand money wheels 190, 195, 198 are initially used with a unit volume price range of $2.999 or $5.999. The 100, 200 and 400 value right hand money wheels 191, 196, 199 are then used with the $2.000 or $5.999 price range and also when the price range is increased by a factor of ten to $29.99 or $59.99.

Accordingly, the cost drive ratio selector mechanism 42 provides for either a standard drive ratio to the cost counters (with the 2:1 gear ratio) or selectively reducing the drive ratio by a factor of two (2) or four (4). The one-half speed reduction is used with substitute 20, 200 and even 2000 value right hand cost counter wheels and the one-fourth speed reduction is used with substitute 40, 400 and even 4000 value right hand cost counter wheels. By substituting 20, 200 and 2000 value wheels and a one-half speed reduction for 10, 100 and 1000 value wheels respectively and the standard drive ratio (i.e. 2:1 gear ratio), the established unit volume price of the mechanical computer 8 can be doubled without increasing the cost counter speed. Likewise, by substituting 40, 400 and 4000 value wheels and a one-fourth speed reduction in place of 10, 100 and 1000 value wheels respectively and the standard drive ratio, the established unit volume price can be quadrupled without increasing the cost counter speed.

Thus, in the U.S.A. the gear ratios of the computer provide for using 10, 20 and 40 value right hand money wheels as long as the decimal point selector lever is set to establish a maximum unit volume price of $2.999 or $5.999. The 100, 200 and 400 value right hand money wheels are subsequently used in the U.S.A. to reduce the speed of the right hand counter wheels as the unit volume price of fuel increases and are also used for registering the cost when the decimal point shift lever 34 is set to establish the $29.99 or $59.99 price range. Thus, although a set of 100, 200 and 400 value wheels or a set of 10, 20 and 40 value wheels or even a set of 1000, 2000 and 4000 value wheels may be used in any particular country in accordance with the currency and pricing practices of that country, the use of a plurality of sets of numeral wheels along with the decimal point shift lever 34 and the cost drive ratio selector mechanism 42 make the mechanical computer 8 essentially inflation proof and continuingly useful even up to a unit volume price of for example in the U.S.A. of $29.99 or $59.99 or even higher.

Figure 2:
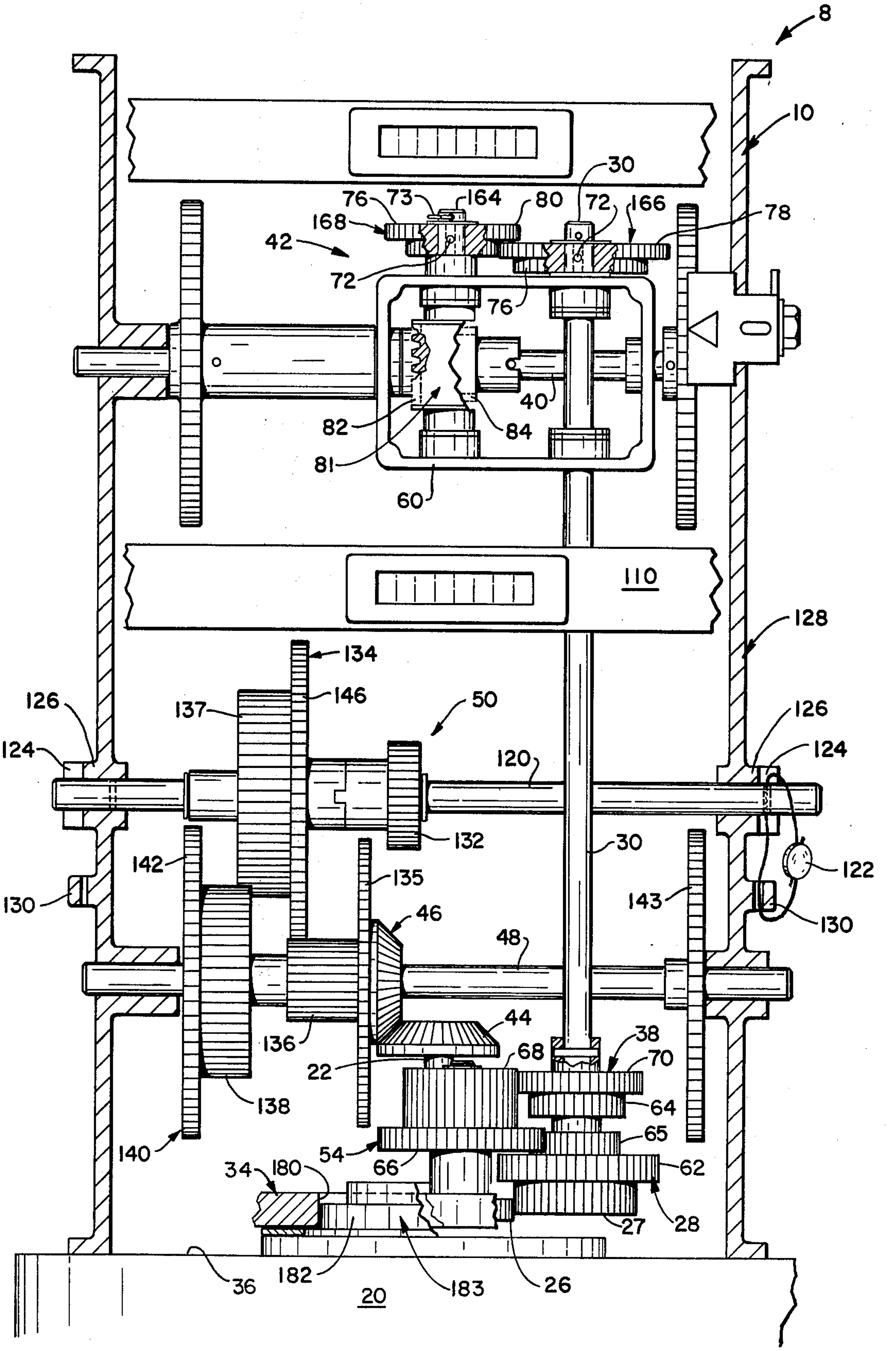
FIG. 2 is an enlarged partial front elevation section view, partly broken away and partly in section, of the fuel pump computer showing the conversion mechanism in greater detail.
Figure 3:
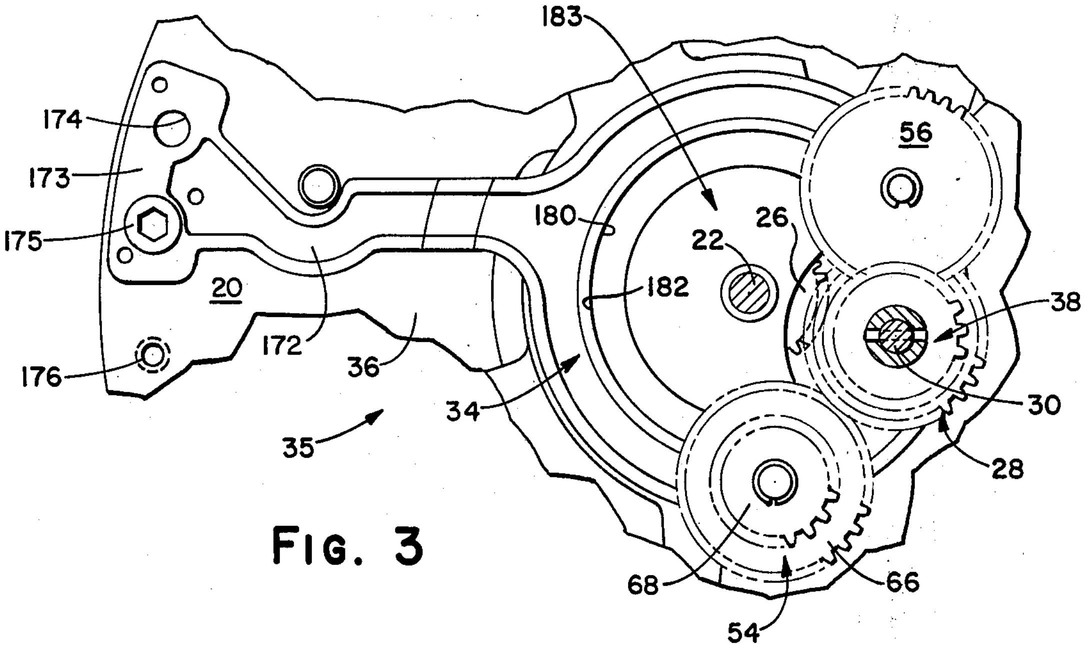
FIG. 3 is an enlarged top plan section view, partly broken away and partly in section, of the fuel pump computer showing a pivotal decimal point shift lever of the conversion mechanism.
Figure 4:
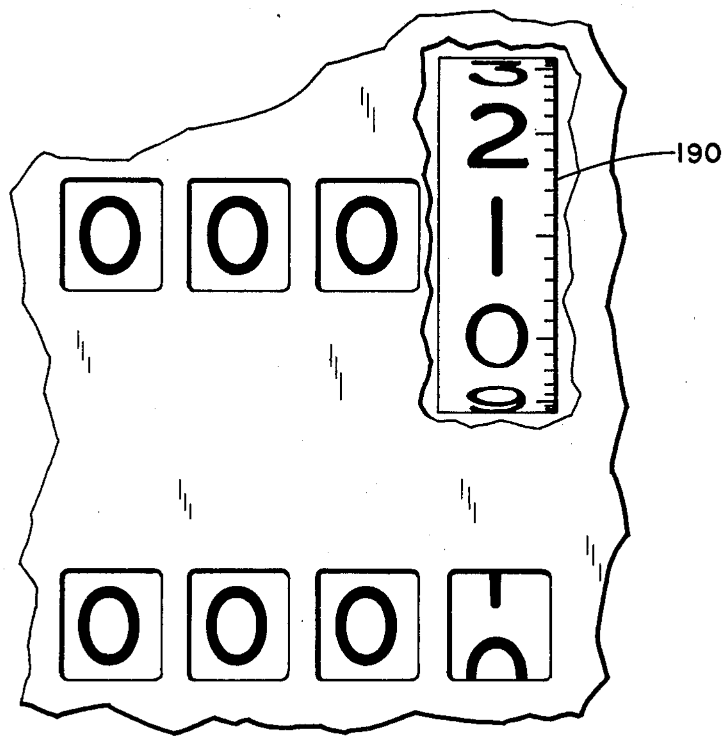
FIG. 4 is an enlarged partial front elevation view of the computer, partly broken away and partly in section, showing cost and volume counters of the computer with 10 value, single transfer right hand number wheels.
Figure 5:
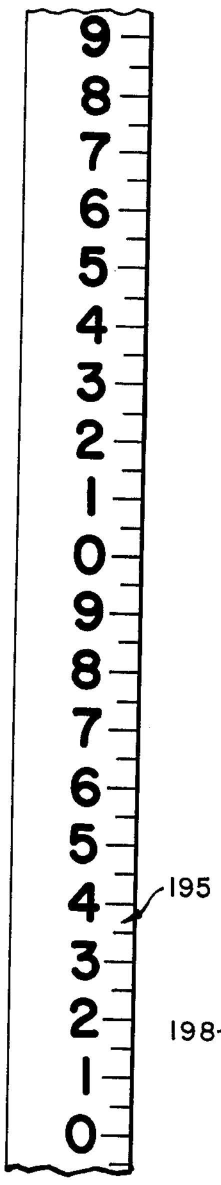
FIGS. 5–9 are enlarged views showing alternative right hand number wheels for the cost counter.
Figure 6:
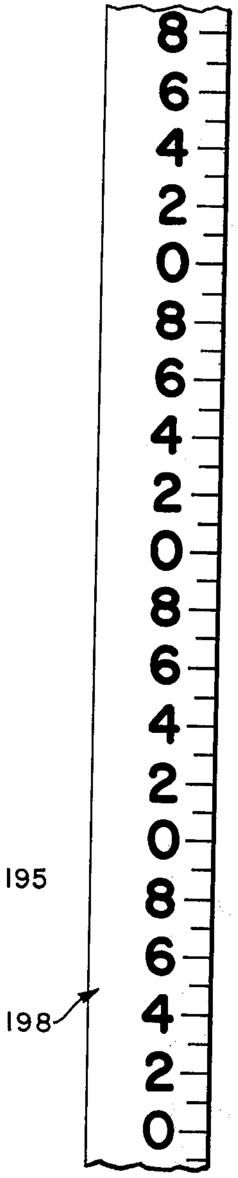
Figure 7:
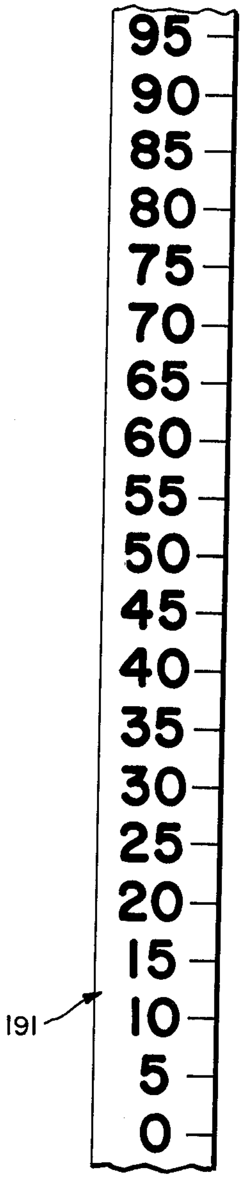
Figure 8:
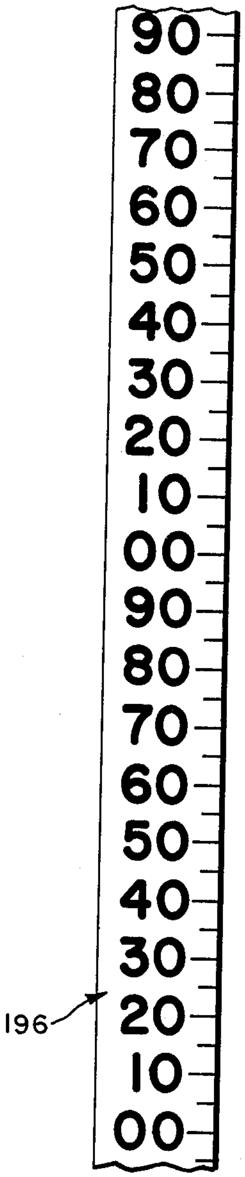
Figure 9:
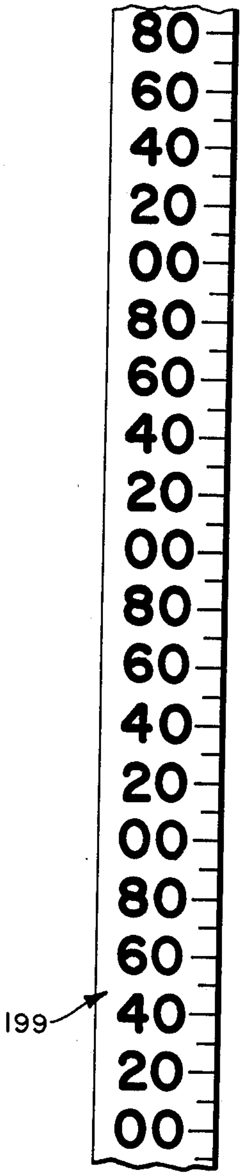

Referring to FIGS. 1 and 2, the cost drive ratio selector mechanism 42 comprises a generally box-like housing or frame 60 mounted on the vertical and horizontal cost shafts 30, 40. Suitable bushings or bearings 162 are press fit within aligned openings in the frame for receiving the vertical and horizontal cost shafts. Also, an intermediate drive shaft 164 is rotatably supported within a third pair of aligned bushings or bearings 162 press fit within aligned openings in the frame. The intermediate drive shaft 164 is mounted parallel to the vertical cost shaft 30, and a pair of intermeshing spur compound gears 166, 168 of molded plastic construction are mounted above the housing 60 on the upper ends of the vertical cost shafts 30,164 for driving the intermediate shaft 164 with the cost drive shaft 30. Each of the compound gears 166, 168 has a pair of diametrically opposed axial slots or keyways for receiving the ends of a radial drive pin 72 mounted on each of the shafts 30, 164 for coupling the gears 166, 168 to the shafts. The compound gears 166, 168 are retained on the shafts by a suitable removable retainer clip 73 mounted on the outer end of the intermediate drive shaft 164 so that each compound gear 166, 168 may be readily mounted in either of two reverse axial positions on either shaft 30, 164.

The two compound gears 166, 168 are axially positioned on the shafts 30, 164 so that the upper shaft gear of the compound gear mounted on the input cost shaft 30 is aligned to intermesh with the lower gear of the compound gear mounted on the intermediate cost shaft 164. The two compound gears 166,168 have twenty-seven tooth gears 76 adapted to intermesh to provide a 1:1 gear or drive ratio between the two cost shafts 30,164. Also, one of the two compound gears 166 has a thirty-six tooth gear 78 and the other compound gear 168 has an eighteen tooth gear 80 adapted to intermesh to provide a 2:1 drive ratio or a 1:2 ratio depending on whether the thirty-six and eighteen tooth gears 78, 80 are mounted on the drive and driven shafts respectively or vice versa. Thus, the two compound gears 166, 168 are adapted to be selectively mounted on the two cost shafts 30, 164 to selectively provide each of three available gear ratios which are 2:1, 1:1 and 1:2 or *relative* gear ratios of 1, ½ and ¼ respectively. Each of the three available gear or drive ratios may be readily selected merely by removing the retaining clip 73 and properly mounting the compound gears 166, 168 on the two vertical shafts 30, 164. Also, a suitable substitute pair of gears (not shown) may be mounted on the cost shafts 30,164 in place of the compound gears 166, 168 for conversion of the cost drive train to register the cost amount of fuel dispensed from either U.S. or Imperial gallons to either quarts or liters as may become necessary or desirable in the future.

The intermediate vertical cost shaft 164 is connected to the horizontal cost shaft 40 by 1:5 right-angle reduction gearing 81 provided by a helix type drive gear 82 mounted on the vertical cost shaft 164 and a helix type driven gear 84 mounted on the horizontal cost shaft 40. The helix type drive and driven gears 82, 84 are designed to employ primarily recess action type of tooth engagement between their teeth when the gear 82 is the drive gear (during the delivery of fuel) and as a result employ primarily approach action type of tooth engagement upon sudden termination of a fuel delivery when the gear 84 attempts to act as the drive gear in the same or forward angular direction due to the inertia of the cost counters 14.

Figure 10:
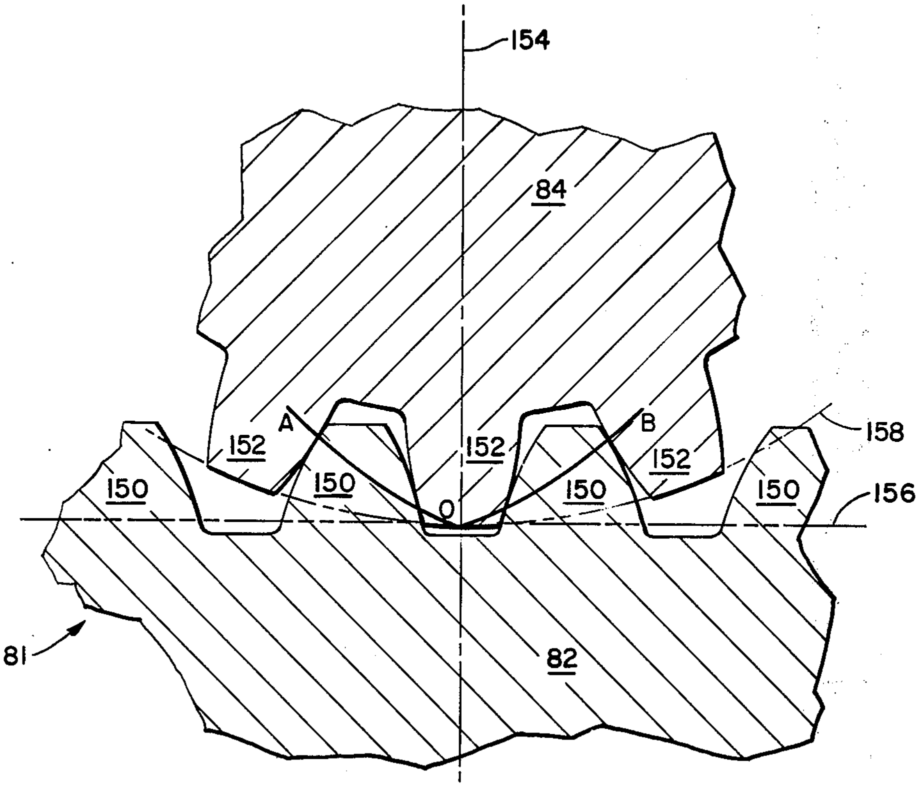
FIG. 10 is a schematic showing the intermeshing tooth action of a gear pass of the conversion mechanism.

Referring to FIG. 10, the gears 82, 84 have an involute tooth form based on the same system as standard involute tooth forms. However, the involute tooth forms of the gear teeth are designed so that during normal forward drive of the driven gear 84 by the drive gear 82, each of the four helical teeth 150 of the drive gear 82 initially engages one of the twenty helical teeth 152 of the driven gear 84 preferably at (and not substantially before) the line of centers 154 of the two gears 82, 84. Accordingly, tooth engagement takes place primarily along a surface of each drive gear tooth 150 which is radially outwardly of the pitch circle (or cylinder) 156 of the helical drive gear 82 (which has a diameter slightly larger than the root diameter of the drive gear) and along a surface of the driven gear tooth 152 which is radially inwardly of the pitch circle 158 of the driven gear 84 (which pitch circle has a diameter equal to the O.D. of the driven gear 84). A curved line O-A is shown in FIG. 10 to illustrate the path of the point of contact of the teeth 150, 152 as the drive gear 82 drives the driven gear 84 in the normal or forward direction.

Such recess action engagement by the drive gear 82 with the driven gear 84 provides a low friction drive because it occurs while the engaging teeth are separating or receding from each other. If, however, the gear 84 attempts to drive the gear 82 in the same angular direction due to the inertia of the cost counters when a fuel delivery is suddenly terminated, the tooth action between the gears is essentially reversed and high friction, approach action type of tooth engagement occurs while the intermeshing teeth approach each other. A curved line B-O is shown in FIG. 10 to illustrate the path of the point of contact of the teeth 150, 152 as the driven gear 84 attempts to drive the drive gear 82 in the normal or forward direction. The frictional resistance against rotation during such approach action engagement of the teeth is approximately three times the frictional resistance during recess action engagement of the teeth. That high frictional resistance during such approach action engagement of the teeth in combination with the helix angle (15°) of the gears 82, 84 provides an overtravel friction lock against forward overtravel of the cost counters 14.

The helix type right-angle reduction gearing 81 thereby provides for driving the horizontal cost shaft 40 in a manner which normally provides a low friction drive and yet which prevents a forward overtravel drive through the gears 84, 82 by the inertia of the cost counters when a fuel delivery is suddenly terminated. Accordingly, the helix type right-angle reduction gearing prevents overtravel of the drive train upstream of the horizontal cost shaft 40 at the end of a fuel delivery which might otherwise occur due to the play or backlash in the upstream gear train. Any such overtravel at the end of a fuel delivery would cause a cost counter readout error in that delivery and also at the beginning of a succeeding delivery. As a result of the additional gear passes provided in the cost counter drive train by the cost drive ratio selector mechanism 42 and the two-position decimal point shift lever 34, there is more gear play or backlash in the cost counter drive train. Also, when the value of the right hand cost counter wheels are increased by any given factor, the cost counter readout error caused by any given wheel overtravel is magnified by the same factor. Therefore, it is important to minimize the inertia overtravel of the cost counters at the end of the fuel delivery. The described recess action type reduction gearing 81 is provided to restrict such overtravel to that permitted by the very limited play in the gear passes downstream of the right-angle reduction gearing 82, 84.

Referring to FIG. 1, the variator 20 is also modified to incorporate a one-way reverse brake 90 to prevent reverse rotation of the cost and volume drive trains due to bounce caused by sudden termination of a fuel delivery. As any such reverse rotation would cause a fuel delivery readout error, the reverse brake 90 is provided to prevent such errors. The reverse brake 90 comprises an auxiliary gear 92 which is mounted on a fixed upright shaft 93 on the variator bottom plate 94 in mesh with the lowest or largest gear step 96 of the conventional variator gear cone 98. A suitable reverse roller brake 100 is provided within the gear hub to prevent reverse rotation of the auxiliary gear 92 on the fixed shaft 93 and thereby to prevent reverse rotation of the cone gear 98 and the downstream cost and volume drive trains.

The volume drive ratio selector mechanism 50 provides for selectively increasing the volume drive ratio between the volume input gear 46 of the register 10 and the volume counters 12 by a factor of ten. The increased drive ratio provides in effect for shifting the volume counter decimal one place to the left for reading the volume, for example in the U.S.A. in hundredths of a gallon (with the right hand volume counter wheels rotating one revolution for each one-tenth of a gallon unit volume of fuel dispensed). The increased volume readout resolution provides greater correspondence between the volume and cost readings of the register 10 at higher unit volume prices when otherwise a small angular error in the lowest order volume counter wheels would amount to a considerable amount of money. By converting the lowest order volume counter wheels to tenth unit volume wheels for reading the accumulated volume to the nearest hundredth of the unit volume on which the unit volume price is based, the volume reading is made sufficiently precise to provide mathematical correspondence between the volume and cost counter readings within the established accuracy requirements.

The volume drive ratio selector mechanism 50 comprises an auxiliary horizontal volume shaft 120 adjacent and parallel to the conventional horizontal volume shaft 48 and axially shiftable between two axial operating positions. The two axial positions provide a standard or "low" speed, reduction gear ratio of 1:4 and a "high" speed step-up gear ratio of 10:4 for shifting the volume counter decimal point one place to the left. The shiftable shaft 120 is shown in its standard or "low" speed axial position with a seal 122 retaining it in that position. The seal 122 is received within a transverse opening in the shaft 120, a slot 124 in a shaft mounting boss 126 of the register frame 128 and an opening in an integral lug 130 of the frame 128. Accordingly, the seal 122 provides for locking the shaft 120 in its "low" speed axial position and must be broken to shift the auxiliary shaft 120 to the left as viewed in FIG. 2, to its "high" speed axial operating position where it is adapted to be similarly sealed at its other axial end.

An auxiliary spur gear 132 and an auxiliary compound spur gear 134 are rotatably mounted but axially retained on the auxiliary volume shaft 120 to selectively engage spur gears 135, 136 respectively of the volume input gear 46 of the register 10, depending on the axial operating position of the auxiliary shaft 120. Also, a gear 137 of the compound gear 134 remains in mesh with a gear 138 of a compound gear 140 in both axial operating positions of the shiftable shaft 120. A second spur gear 142 of the compound gear 140 is connected to drive one of the volume counters 12 in the conventional manner. Also, the compound gear 140 is secured to the horizontal volume shaft 48 to drive the other volume counter 12 via a spur gear 143 secured to the other end of the horizontal volume shaft 48.

In the standard or "low" speed axial operating position of the shiftable shaft 120, a relatively large gear 146 of the auxiliary compound gear 134 engages the gear 136 and the auxiliary shaft output gear 137 engages the gear 138. In the "high" speed axial operating position of the auxiliary volume shaft 120, the auxiliary spur gear 132 engages the gear 135 and the auxiliary gear 137 remains in engagement with the gear 138. The hubs of the two auxiliary gears 132, 134 are suitably keyed together to provide the "high" speed drive.

When the mechanical computer is used with a gallon unit volume and the maximum fuel delivery rate is 15 gallons a minute, the maximum speed of the right hand volume counter wheels is 150 rpm in the "high" speed setting of the auxiliary volume shaft 120. When the mechanical computer is employed with a liter unit volume having a maximum delivery rate of 50 liters per minute, the right hand volume counter wheels would have a maximum speed of 500 rpm in the "high" speed setting of the auxiliary shaft 120. Accordingly, the "high" speed setting of the auxiliary volume shaft 120 is not recommended with a liter unit volume. Also, when a liter unit volume is used, the right hand volume counter wheels would normally provide a sufficiently precise volume readout in the "low" speed setting of the auxiliary volume shaft 120 so that the "high" speed setting is not required.

In a conventional manner, the register 10 employs a volume totalizer module 110 (for example of the type disclosed in U.S. Pat. No. 4,200,785 of Alfred C. Evans et al, dated Apr. 29, 1980 and entitled "Computer Pulse Generator") for recording the total volume amount of fuel dispensed. The totalizer 110 is driven with the volume counters and conventionally provides the same volume readout resolution as the volume counters 12. In the alternative to employing the described volume drive ratio selector mechanism 50, the totalizer module 110 could be suitably modified to increase its resolution by a factor of ten by providing 10:1 speed up gearing (not shown) to the right hand number wheel of the totalizer. Then the right hand totalizer wheel would be a tenth unit volume wheel with each of ten graduations representing 0.01 unit volume, and the totalizer could be used to establish the mathematical accuracy of the computer by comparing the increase in the totalizer volume readout with the cost counter readout during a test delivery.

As will be apparent to persons skilled in the art, various modifications, adaptations and variations of the foregoing specific disclosure can be made without departing from the teachings of the present invention.

I claim:

1. In a mechanical computer for a fuel dispenser operable for setting the unit volume price and registering the volume and cost amounts of fuel dispensed and having a volume counter drive train, at least one rotary volume counter, with a plurality of coaxial number wheels of increasing order of significance, rotated by the volume counter drive train for registering the volume amount of fuel dispensed, a cost counter drive train with a first rotary cost shaft rotated in accordance with the volume amount of fuel dispensed and the set unit volume price and a second rotary cost shaft transverse to and rotated by said first rotary cost shaft, and at least one rotary cost counter, with a plurality of coaxial number wheels of increasing order of significance, rotated by said second rotary cost shaft for registering the cost amount of fuel dispensed, the improvement wherein the mechanical computer comprises a cost drive ratio selector mechanism for selectively providing a plurality of different cost counter drive ratios between said first and second rotary cost shafts, the cost drive ratio selector mechanism comprising an intermediate rotary shaft generally parallel to one of said first and second rotary shafts, first and second intermeshing gear means adapted to be selectively mounted on said one and said intermediate rotary shafts to selectively intermesh to selectively provide a plurality of different drive ratios therebetween, and third and fourth intermeshing gear means mounted on the said intermediate rotary shaft and the other of said first and second rotary shafts to provide a rotatable drive therebetween.

2. A mechanical computer for a fuel dispenser according to claim 1 wherein the first and second intermeshing gear means are compound gears selectively mountable on said one and said intermediate rotary shafts to selectively intermesh to selectively provide first, second and third different drive ratios therebetween.

3. In a mechanical computer for a fuel dispenser operable for setting the unit volume price and registering the volume and cost amounts of fuel dispensed and having a price variator module selectively settable for selectively establishing the unit volume price of fuel disposed within a predetermined multiple place unit volume price range, the price variator module having a rotary volume shaft rotated in accordance with the volume amount of fuel dispensed and a rotary cost output rotated in accordance with the rotation of the rotary volume shaft and the unit volume price established by the price variator module, and a register module with a volume counter drive train rotated by the rotary volume shaft of the price variator module, at least one rotary volume counter, with a plurality of coaxial number wheels of increasing order of significance, rotated by the volume counter drive train for registering the volume amount of fuel dispensed, a cost counter drive train rotated by the said rotary cost output of the price variator module and having a first rotary cost shaft and a second rotary cost shaft transverse to and rotated by said first rotary cost shaft, and at least one rotary cost counter, with a plurality of coaxial number wheels of increasing order of significance, rotated by said second rotary cost shaft for registering the cost amount of fuel dispensed, the improvement wherein the register module comprises a cost drive ratio selector mechanism for selectively providing a plurality of different cost counter drive ratios between said first and second rotary cost shafts, the variable cost drive ratio selector mechanism comprising an intermediate rotary shaft, first and second intermeshing gear means adapted to be selectively mounted on said intermediate rotary shaft and said first rotary cost shaft to selectively intermesh to selectively provide a plurality of different drive ratios therebetween, and third and fourth intermeshing gear means mounted on said intermediate rotary shaft and said second rotary cost shaft to provide a rotatable drive therebetween which prevents inertia overtravel drive through said third and fourth gear means by the inertia of the cost counter.

4. A mechanical computer for a fuel dispenser according to claim 1 or 3 wherein said first and second gear means comprise first and second compound gears respectively selectively mountable on said first rotary cost shaft and said intermediate rotary shaft to selectively provide first, second and third different drive ratios therebetween.

5. A mechanical computer for a fuel dispenser according to claim 4 wherein said first, second and third drive ratios provide relative speed ratios of one, one-half and one-fourth.

6. A mechanical computer for a fuel dispenser according to claim 5 wherein said first, second and third different drive ratios are 2:1, 1:1, and 1:2 respectively.

7. A mechanical computer for a fuel dispenser according to claim 1 or 3 wherein the cost counter drive train comprises a decimal point selector mechanism for individually selecting two relative drive ratios which differ by a factor of ten.

8. A mechanical computer for a fuel dispenser according to claim 4 wherein said first and second compound gears have a first pair of spur gears respectively of the same size adapted to intermesh to provide a 1:1 gear ratio and a second pair of spur gears respectively of different size adapted to intermesh to selectively provide 2:1 and 1:2 gear ratios.

9. A mechanical computer for a fuel dispenser according to claim 1 or 2 wherein the third and fourth intermeshing gear means prevent inertia overtravel drive therethrough by the inertia of the cost counter.

10. A mechanical computer for a fuel dispenser according to claim 7 wherein the volume counter drive train comprises a volume drive ratio selector mechanism for individually selecting two relative drive ratios which differ by a factor of ten.

11. A conversion mechanism for a mechanical computer for a fuel dispenser operable for setting the unit volume price and registering the volume and cost amounts of fuel dispensed and having a volume counter drive train, at least one rotary volume counter, with a plurality of coaxial number wheels of increasing order of significance, rotated by the volume counter drive train for registering the volume amount of fuel dispensed, a cost counter drive train with a first rotary cost shaft rotated in accordance with the volume amount of fuel dispensed and the set unit volume price, and a second rotary cost shaft transverse to and rotated by said first rotary cost shaft, and at least one rotary cost counter, with a plurality of coaxial number wheels of increasing order of significance, rotated by said second rotary cost shaft for registering the cost amount of fuel dispensed, the conversion mechanism comprising gear pass between said first and second rotary cost shafts comprising helix type, intermeshing drive and driven gears having drive and driven gear teeth respectively having relatively low friction, primarily recess action engagement with drive therethrough by the drive gear and relatively high friction, primarily approach action engagement with overtravel drive by the inertia of the cost counter.

12. A conversion mechanism for a mechanical computer for a fuel dispenser operable for setting the unit volume price and registering the volume and cost amounts of fuel dispensed and having a volume counter drive train, at least one rotary volume counter, with a plurality of coaxial number wheels of increasing order of significance, rotated by the volume counter drive train for registering the volume amount of fuel dispensed, a cost counter drive train with a first rotary cost shaft rotated in accordance with the volume amount of fuel dispensed and the set unit volume price, and a second rotary cost shaft transverse to and rotated by said first rotary cost shaft, and at least one rotary cost counter, with a plurality of coaxial number wheels of increasing order of significance, rotated by said second rotary cost shaft for registering the cost amount of fuel dispensed, the conversion mechanism comprising a cost drive ratio selector mechanism, in the cost counter drive train downstream of said first rotary cost shaft, for selectively providing a plurality of different drive ratios, a decimal point selector mechanism, in the cost counter drive train upstream of said first rotary cost shaft, for individually selecting two relative drive ratios which differ by a factor of ten, and an anti-overtravel gear pass upstream of the cost drive ratio selector mechanism, operable to prevent inertia overtravel drive therethrough by the inertia of the cost counter.

13. A conversion mechanism according to claim 12 wherein said plurality of different drive ratios comprise first, second and third different drive ratios having relative speed ratios of one, one-half and one-fourth.

14. A conversion mechanism according to claim 12 or 13 further comprising double transfer and quadruple transfer right hand cost counter wheels having relative readout values of 20 and 40 respectively.

15. A conversion mechanism according to claim 12 or 13 wherein the conversion mechanism comprises a plurality of gear means selectively mountable to selectively provide said plurality of different drive ratios.

16. A conversion mechanism according to claim 11 further comprising a decimal point selector mechanism in the cost counter drive train for individually selecting two relative drive ratios which differ by a factor of ten.

17. In a mechanical computer for a fuel dispenser operable for setting the unit volume price and registering the volume and cost amounts of fuel dispensed and having a volume counter drive train, at least one rotary volume counter, with a plurality of coaxial number wheels of increasing order of significance, rotated by the volume counter drive train for registering the volume amount of fuel dispensed, a cost counter drive train rotated in accordance with the product of the volume amount of fuel dispensed and the unit volume price setting of the computer and at least one rotary cost counter, with a plurality of coaxial number wheels of increasing order of significance, rotated by said cost counter drive train for registering the cost amount of fuel dispensed, the cost counter drive train comprising a cost decimal point selector mechanism for individually selecting two alternative cost counter drive ratios which differ by a factor of ten, the improvement wherein the volume counter drive train comprises a volume decimal point selector mechanism for individually selecting two alternative volume counter drive ratios which differ by a factor of ten.

18. A mechanical computer for a fuel dispenser according to claim 17 wherein the volume counter drive train comprises a horizontal rotary volume shaft connected to rotate the volume counter in accordance with the volume amount of fuel dispensed, and wherein the volume decimal point selector mechanism comprises volume drive gear means rotatably mounted on said horizontal volume shaft and rotated in accordance with the volume amount of fuel dispensed, volume driven gear means mounted on said horizontal volume shaft to drive said volume shaft, an auxiliary shaft parallel to said horizontal volume shaft and axially shiftable to first and second axial operating positions thereof, and gear means mounted on said auxiliary shaft and axially shiftable thereby to selectively engage said drive gear means and said driven gear means in said first and second axial positions of the auxiliary shaft to selectively provide said two alternative volume counter drive ratios.

19. In a mechanical computer for a fuel dispenser operable for setting the unit volume price and registering the volume and cost amounts of fuel dispensed and having a volume counter drive train, at least one rotary volume counter, with a plurality of coaxial number wheels of increasing order of significance, rotated by the volume counter drive train for registering the volume amount of fuel dispensed and the set unit volume price and at least one rotary cost counter, with a plurality of coaxial number wheels of increasing order of significance, rotated by the cost counter drive train for registering the cost amount of fuel dispensed, the improvement wherein the cost counter drive train comprises a gear pass with helix type intermeshing drive and driven gears having drive and driven gear teeth respectively with relatively low friction, primarily recess action engagement during forward drive therethrough by the drive gear and relatively high friction primarily approach action frictional locking engagement which prevents over-travel drive therethrough by the inertia of the cost counter.

20. A mechanical computer for a fuel dispenser according to claim 19 wherein the cost counter drive train comprises first and second rotary cost shafts extending at right angles to each other, and wherein the helix type intermeshing drive and driven gears are mounted on said first and second rotary cost shafts to provide a right-angle drive therebetween.

21. In a mechanical computer for a fuel dispenser operable for setting the unit volume price and registering the volume and cost amounts of fuel dispensed and having a volume counter drive train, at least one rotary volume counter, with a plurality of coaxial number wheels of increasing order of significance, rotated by the volume counter drive train for registering the volume amount of fuel dispensed, a cost counter drive train with a first rotary cost shaft rotated in accordance with the volume amount of fuel dispensed and the set unit volume price and a second rotary cost shaft transverse to and rotated by said first rotary cost shaft, and at least one rotary cost counter, with a plurality of coaxial number wheels of increasing order of significance, rotated by said second rotary cost shaft for registering the cost amount of fuel dispensed, the improvement wherein the mechanical computer comprises a cost drive ratio mechanism for establishing the cost counter drive ratio between said first and second rotary cost shafts, the cost drive ratio mechanism comprising an intermediate rotary shaft generally parallel to one of said first and second rotary shafts, first and second intermeshing gear means mounted on said one and said intermediate rotary shafts to intermesh to establish the drive ratio therebetween, and third and fourth intermeshing gear means mounted on the said intermediate rotary shaft and the other of said first and second rotary shafts to provide a rotatable drive therebetween.

* * * * *